(12) United States Patent
Van Broeck

(10) Patent No.: US 8,559,632 B2
(45) Date of Patent: Oct. 15, 2013

(54) METHOD FOR TRANSFERRING MESSAGES COMPRISING EXTENSIBLE MARKUP LANGUAGE INFORMATION

(75) Inventor: Sigurd Van Broeck, Zoersel (BE)

(73) Assignee: Alcatel Lucent, Paris (FR)

( * ) Notice: Subject to any disclaimer, the term of this patent is extended or adjusted under 35 U.S.C. 154(b) by 1661 days.

(21) Appl. No.: 11/690,574

(22) Filed: Mar. 23, 2007

(65) Prior Publication Data

US 2007/0230689 A1   Oct. 4, 2007

(30) Foreign Application Priority Data

Apr. 4, 2006   (EP) .................................... 06290573

(51) Int. Cl.
*H04L 9/30* (2006.01)
(52) U.S. Cl.
USPC ............................................ 380/30; 713/153
(58) Field of Classification Search
USPC ....................................................... 713/153
See application file for complete search history.

(56) References Cited

U.S. PATENT DOCUMENTS

| | | | |
|---|---|---|---|
| 6,084,969 A * | 7/2000 | Wright et al. ................. | 380/271 |
| 2005/0286723 A1 * | 12/2005 | Vig et al. ...................... | 380/278 |
| 2006/0123226 A1 * | 6/2006 | Kumar et al. ................. | 713/154 |

OTHER PUBLICATIONS

Simple Object Access Protocol (SOAP) 1.1 W3C Note May 8, 2000 This version: http://www.w3.org/TR/2000/NOTE-SOAP-20000508.*
Gerald Brose: "Securing Web Services with SOAP Security Proxies," The 2003 International Conference on Web Services; Jun. 23, 2003; XP002395650.
Lieven Desmet, et al.: "Threat Modelling for Web Services Based Web Applications," Eighth IFIP TC-6 TC-11 Conference on Communications and Multimedia Security, CMS 2004; Sep. 15, 2004; XP002395651.
D'Angelo P, et al.: "Using a WAP phone as robot interface," Proceedings 2002 IEEE International Conference on Robotics and Automation (Cat. No. 02CH37292) IEEE Piscataway, NJ, USA, vol. 2, 2002, pp. 1173-1178; XP002395652.
Jyh-How Huang, et al.: "A level key infrastructure for secure and efficient group communication in wireless sensor networks," First International Conference on Security and Privacy for Emerging Areas in Communications Network IEEE Comput. Soc; Los Alamitos, CA, USA, 2005, pp. 249-260; XP002395653.

* cited by examiner

*Primary Examiner* — Jeffrey Pwu
*Assistant Examiner* — Nega Woldemariam
(74) *Attorney, Agent, or Firm* — Fay Sharpe LLP

(57) ABSTRACT

Methods for transferring messages (30) comprising extensible markup language information from sources (104) via intermediates (105) to destinations (106) are provided with hop-by-hop encryption/decryption processes instead of end-to-end encryption/decryption processes to reduce a complexity and to make non-encrypted messages (30) available inside the intermediates (105). The encryption/decryption processes are different per hop. An encryption/decryption of the message (30) comprises an encryption/decryption of one or more fields of the message (30) and may comprise an addition/detection of a signature. The message (30) may comprise a start envelope field (32), a header field (33-35), a body field (36-38) and a stop envelope field (39). The message (30) may comprise a simple object access protocol message or SOAP message.

20 Claims, 3 Drawing Sheets

Figure 1:
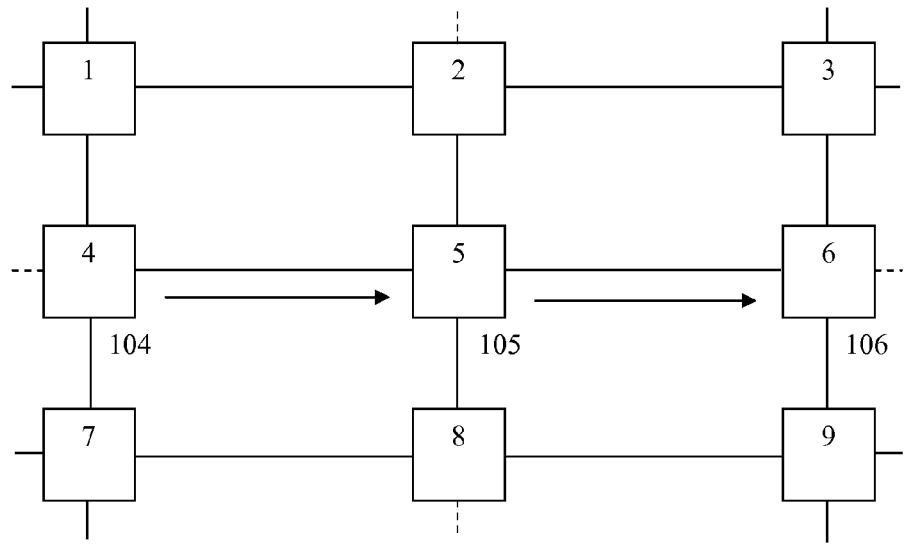

METHOD FOR TRANSFERRING MESSAGES COMPRISING EXTENSIBLE MARKUP LANGUAGE INFORMATION

The invention relates to a method for transferring a message comprising extensible markup language information from a source via an intermediate to a destination.

Extensible markup language information (XML information) is information based on an extensible markup language and/or is information comprising an extensible markup language code. General examples of such a source are source devices such as personal computers and servers and mobile phones. General examples of such an intermediate are intermediate devices such as servers, multiplexers, switches, routers, forwarders and bridges. Other general examples of such an intermediate are intermediate systems comprising such servers, multiplexers, switches, forwarders and bridges, and intermediate networks comprising such servers, multiplexers, switches, forwarders and bridges. General examples of such a destination are destination devices such as personal computers and servers and mobile phones.

A prior art method is of common general knowledge. According to this prior art method, a message comprising extensible markup language information is transferred from a source via an intermediate to a destination. In case the message needs to be encrypted, it is encrypted inside the source. It is then passed via the intermediate to the destination, and it is decrypted inside the destination. So, no encryption/decryption takes place inside the intermediate. In other words, in the known method the encryption/decryption is end-to-end.

The known method is disadvantageous, inter alia, owing to the fact that usually each pair of a source and a destination has its own encryption/decryption process. As a result, a source must retrieve encryption/decryption information for each possible destination and/or must store this encryption/decryption information for each possible destination. This makes the prior art method relatively complex.

It is an object of the invention, inter alia, to provide a method as defined above that is relatively simple.

The method according to the invention is characterized in that the method comprises
- a first step of, at the source, encrypting the message according to a first encryption/decryption process for gaining a firstly encrypted message and transmitting the firstly encrypted message to the intermediate,
- a second step of, at the intermediate, receiving the firstly encrypted message and decrypting the firstly encrypted message according to the first encryption/decryption process for regaining the message,
- a third step of, at the intermediate, encrypting the message according to a second encryption/decryption process for gaining a secondly encrypted message and transmitting the secondly encrypted message to the destination, and
- a fourth step of, at the destination, receiving the secondly encrypted message and decrypting the secondly encrypted message according to the second encryption/decryption process for regaining the message.

By introducing a hop-by-hop encryption/decryption instead of the known end-to-end encryption/decryption, between the source and the intermediate a first encryption/decryption process is used and between the intermediate and the destination a second encryption/decryption process is used. As a result, it is no longer necessary to retrieve encryption/decryption information for many possible destinations and/or to store this encryption/decryption information for many possible destinations. Only encryption/decryption information for a few intermediates is to be retrieved and/or only the encryption/decryption information for a few intermediates is to be stored. The method according to the invention is therefore relatively simple.

The method according to the invention is further advantageous, inter alia, in that inside the intermediate the non-encrypted message is available for routing and monitoring and other purposes and in that hop-by-hop encryption/decryption allows messages to be multicasted and/or broadcasted, which is difficult for end-to-end encryption/decryption.

Other advantages of the hop-by-hop encryption/decryption are that it is relatively simple to encrypt also source information, intermediate information and destination information (such as identifications and addresses etc.) during a transfer, which is difficult for end-to-end encryption/decryption, and that a transmitting party only needs to resolve a (single) intermediate instead of each destination. This will make e.g. a Domain Name Server resolution much simpler.

More particular examples of such a source and such a destination are optimized XML-documents transfer protocol enabled platforms (OXTP enabled platforms) that can transmit and receive optimized XML-documents via a transfer protocol. OXTP enabled platforms can be "dedicated" platforms such as smart devices like traffic lights, refrigerators, radiators, doors/gates, light switches, etc. and can be "general purpose" platforms such as smart devices like personal computers, servers, personal digital assistants, etc. and can be any mix of the above like mobile phones, set top boxes, etc. In other words, OXTP enabled platforms can be devices or systems that run one or more OXTP enabled programs (services, applications) with which other programs can communicate. More particular examples of such an intermediate are OXTP enabled platforms that can transfer optimized XML-documents. The method may then comprise and/or form part of a federated security optimized XML-document transfer protocol. An optimized XML-document may comprise, in addition to the usual ASCII characters, a binary blog etc.

US 2005/0266826 discloses a method for establishing a security association between a wireless access point and a wireless node. US 2005/0157660 discloses a model for enforcing different phases of the end-to-end negotiation protocol. US 2005/0144457 discloses a message security processing system for web services. US 2004/0168064 discloses a system for digital signature and encryption to XML. US 2004/0078577 discloses a method and apparatus for providing XML document encryption. US 2003/0200349 discloses XML scripting of SOAP commands. US 2002/0054170 discloses end-to-end transaction processing and statusing system and method. None of these documents discloses the hop-by-hop encryption/decryption according to the invention for messages comprising extensible markup language information.

An embodiment of the method according to the invention is characterized in that the first and second encryption/decryption processes are different encryption/decryption processes.

The use of a different encryption/decryption process for a different hop will protect different hops in different ways. For example in case of using public keys and private keys, per hop a transmitting party needs to know or to find out a public key of a receiving party. So, per hop the receiving party defines the public key to be used.

An embodiment of the method according to the invention is characterized in that the encrypting comprises an addition of a signature and in that the decrypting comprises a detection of the signature.

The added signature identifies the sender and improves the overall security and is a great additional advantage. The detection of the signature for example comprises a verification of the signature. The additional use of a different signature/verification process for a different hop will protect different hops additionally in different ways. As is for hop-by-hop encryption/decryption, hop-by-hop signature/verification provides the benefit that the destination does not have to store and/or use all keys of all sources just like the source does not have to store and/or use the keys of all destinations. As a result, a trusted chain is created where e.g. a telecom operator can provide the intermediate (in-the-middle) trust (encryption and signing) between all parties simpler.

An embodiment of the method according to the invention is characterized in that the message comprises a start envelope field, a header field, a body field and a stop envelope field, an encryption of the message comprising an encryption of one or more fields of the message and a decryption of the message comprising a decryption of these one or more fields of the message.

The source can define which field is to be encrypted and/or which fields are to be encrypted. In a minimum situation only one field may be encrypted. In a maximum situation, all fields apart from a message indicator preceding the start envelope field may be encrypted. In the prior art, it was cumbersome to encrypt the header field owing to the fact that the intermediate must be able to route the message. According to the invention, the non-encrypted message is available in the intermediate, and as a result between the source and the intermediate the header field can now be encrypted as well, which further improves the overall security and is a great additional advantage.

Other kinds of fields are not to be excluded. So, in general, the message comprises one or more fields, and an encryption of the message comprises an encryption of at least one of these one or more fields of the message and a decryption of the message comprises a decryption of at least one of these one or more fields of the message.

An embodiment of the method according to the invention is characterized in that the message comprises a simple object access protocol message.

Especially but not exclusively for simple object access protocol messages the hop-by-hop encryption/decryption is expected to become a technical and commercial success.

The invention also relates to an intermediate for performing the second step and the third step of the method according to the invention.

The intermediate according to the invention is characterized in that the intermediate comprises
- a receiver for said receiving of the firstly encrypted message,
- a decryption unit for said decrypting of the firstly encrypted message according to the first encryption/decryption process for regaining the message,
- an encryption unit for said encrypting of the message according to the second encryption/decryption process for gaining the secondly encrypted message, and
- a transmitter for said transmitting of the secondly encrypted message to the destination.

An embodiment of the intermediate according to the invention is characterized in that the first and second encryption/decryption processes are different encryption/decryption processes.

An embodiment of the intermediate according to the invention is characterized in that the encrypting comprises an addition of a signature and in that the decrypting comprises a detection of the signature.

An embodiment of the intermediate according to the invention is characterized in that the message comprises a start envelope field, a header field, a body field and a stop envelope field, an encryption of the message comprising an encryption of one or more fields of the message and a decryption of the message comprising a decryption of these one or more fields of the message.

An embodiment of the intermediate according to the invention is characterized in that the message comprises a simple object access protocol message.

An embodiment of the intermediate according to the invention is characterized in that the decryption unit is arranged to decrypt encrypted messages originating from at least one neighboring intermediate, source and/or destination and is not arranged to decrypt encrypted messages originating from at least one non-neighboring intermediate, source and/or destination and in that the encryption unit is arranged to encrypt messages destined for at least one neighboring intermediate, source and/or destination and is not arranged to encrypt messages destined for at least one non-neighboring intermediate, source and/or destination.

In a general situation, such as a non-emergency situation or a non-privileged situation, the decryption unit cannot decrypt encrypted messages originating from (at least some) non-neighboring intermediates, sources and destinations, and the encryption unit will not encrypt messages destined for (at least some) non-neighboring intermediates, sources and destinations. In a particular situation, such as an emergency situation or a privileged situation, it is not to be excluded that an end-to-end encryption/decryption is to be used, but only for a limited number of destinations.

The invention also relates to a source for performing the first step of the method according to the invention.

The source according to the invention is characterized in that the source comprises
- an encryption unit for said encrypting of the message according to a first encryption/decryption process for gaining a firstly encrypted message, and
- a transmitter for said transmitting of the firstly encrypted message to the intermediate.

An embodiment of the source according to the invention is characterized in that the encryption unit is arranged to encrypt messages destined for at least one neighboring intermediate and is not arranged to encrypt messages destined for at least one non-neighboring intermediate.

The invention also relates to a destination for performing the fourth step of the method according to the invention.

The destination according to the invention is characterized in that the destination comprises
- a receiver for said receiving of the secondly encrypted message, and
- a decryption unit for said decrypting of the secondly encrypted message according to the second encryption/decryption process for regaining the message.

An embodiment of the destination according to the invention is characterized in that the decryption unit is arranged to decrypt messages destined for at least one neighboring intermediate and is not arranged to decrypt messages destined for at least one non-neighboring intermediate.

Embodiments of the source according to the invention and of the destination according to the invention correspond with the embodiments of the intermediate according to the invention. The source and the destination can be produced and/or sold separately from the intermediate.

The invention is based upon an insight, inter alia, that for a large number of possible destinations an end-to-end encryption is relatively complex from a point of view of a transmitting party, and is based upon a basic idea, inter alia, that for a large number of possible destinations in combination with a small number of possible intermediates a hop-by-hop encryption is relatively simple from a point of view of the transmitting party.

The invention solves the problem, inter alia, to provide a method that is relatively simple. The method according to the invention is further advantageous, inter alia, in that inside the intermediate the non-encrypted message is available for routing and monitoring and other purposes and in that hop-by-hop encryption/decryption allows messages to be multicasted and/or broadcasted, which is difficult for end-to-end encryption/decryption.

These and other aspects of the invention will be apparent from and elucidated with reference to the embodiments(s) described hereinafter.

Figure 2:
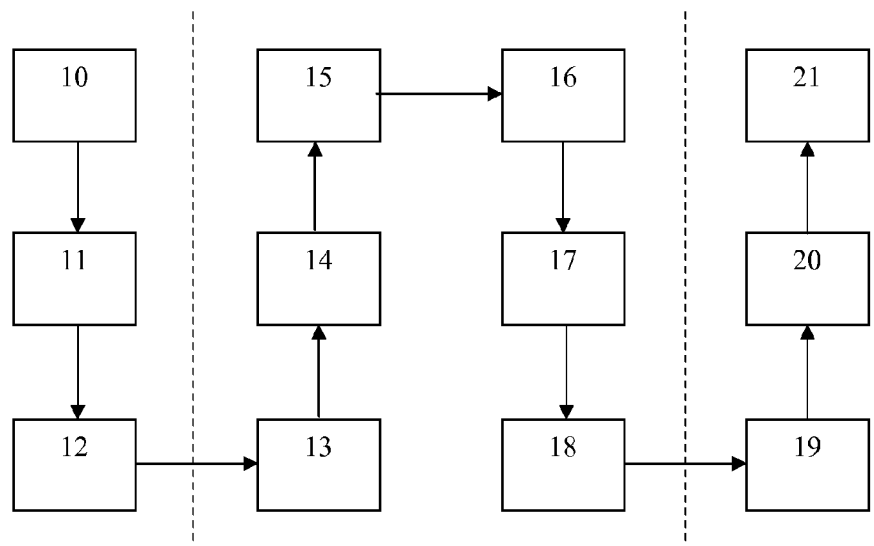
Figure 3:
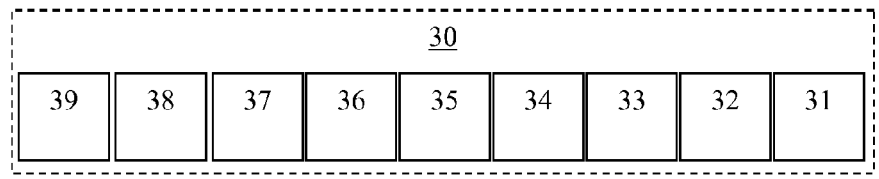
Figure 5:
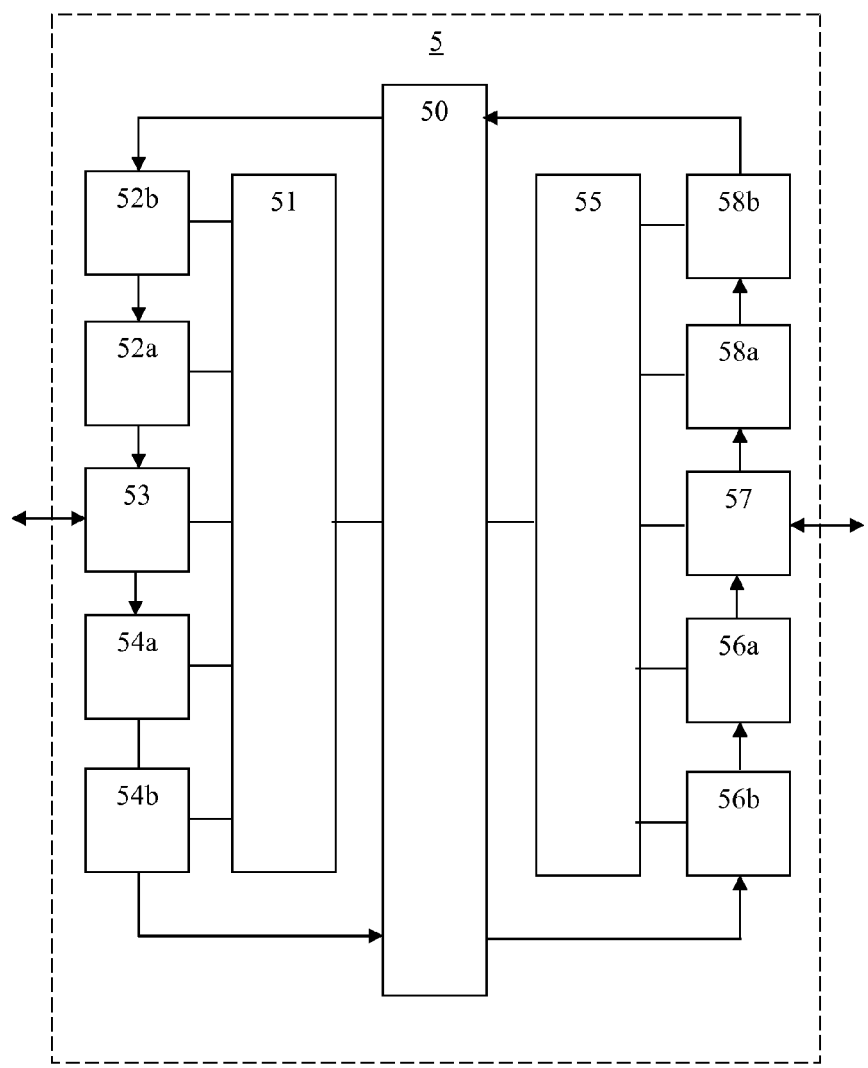
Figure 4:
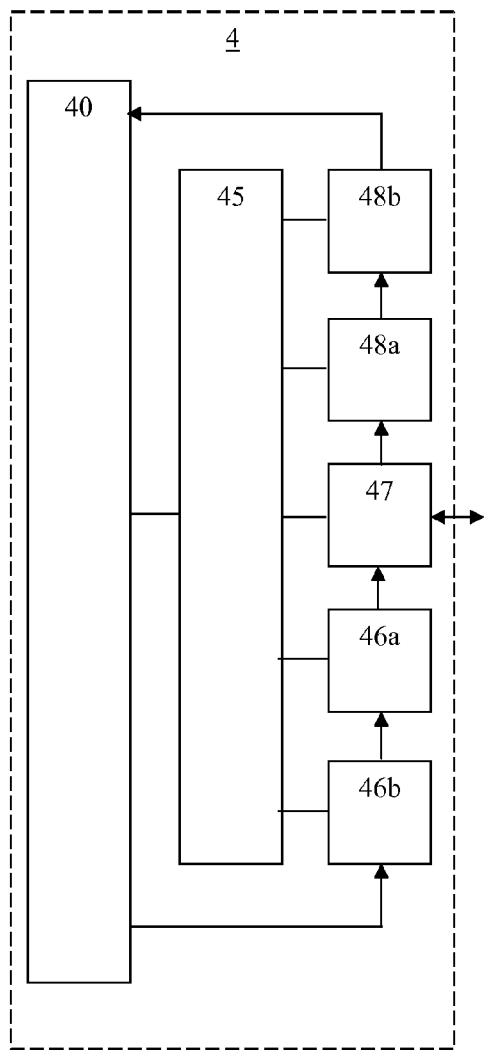
Figure 6:
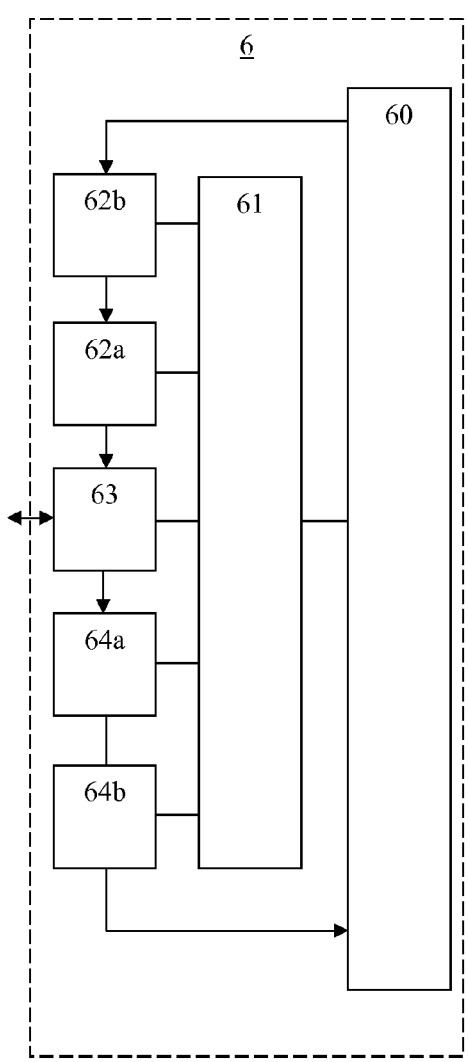

FIG. 1 shows diagrammatically a network comprising nodes, the nodes being sources, intermediates and/or destinations according to the invention, FIG. 2 shows steps of a method according to the invention, FIG. 3 shows an example of a message and its fields, FIG. 4 shows diagrammatically a node representing a source according to the invention, FIG. 5 shows diagrammatically a node representing an intermediate according to the invention, and FIG. 6 shows diagrammatically a node representing a destination according to the invention.

The network shown in the FIG. 1 comprises nodes 1-9, the nodes being sources, intermediates and/or destinations according to the invention. The node 1 is coupled to the nodes 2 and 4, the node 2 is further coupled to the nodes 3 and 5, the node 3 is further coupled to the node 6, the node 4 is further coupled to the nodes 5 and 7, the node 5 is further coupled to the nodes 6 and 8, the node 6 is further coupled to the node 9, the node 7 is further coupled to the node 8 which is further coupled to the node 9.

According to an example, the node 4 is a source 104, the node 5 is an intermediate 105 and the node 6 is a destination 106, and a message 30 shown in the FIG. 3 is sent from the node 4 via the node 5 to the node 6. Examples of the source 104 and the destination 106 are personal computers and servers and mobile phones. Examples of the intermediate 105 are servers, multiplexers, routers, switches, forwarders and bridges, systems comprising such servers, multiplexers, routers switches, forwarders and bridges, and networks comprising such servers, multiplexers, routers switches, forwarders and bridges. So, each node 1-9 may be a device, a system or a network.

More in particular, each node may be an optimized XML-documents transfer protocol enabled platform (OXTP enabled platforms) that can transmit and/or transfer and/or receive optimized XML-documents via a transfer protocol. OXTP enabled platforms can be "dedicated" platforms such as smart devices like traffic lights, refrigerators, radiators, doors/gates, light switches, etc. and can be "general purpose" platforms such as smart devices like personal computers, servers, personal digital assistants, etc. and can be any mix of the above like mobile phones, set top boxes, etc. In other words, OXTP enabled platforms can be devices or systems that run one or more OXTP enabled programs (services, applications) with which other programs can communicate.

Each coupling between two nodes may be a wired coupling, a wireless coupling or a partly wired and partly wireless coupling, without departing from the scope of this invention.

In a prior art situation, the message 30 comprising extensible markup language information is encrypted inside the source 104. It is then passed via the intermediate 105 to the destination 106, and it is decrypted inside the destination 106. So, no encryption/decryption takes place inside the intermediate 105. In other words, in the known method the encryption/decryption is end-to-end. Usually each pair of a source 104 and a destination 106 has its own encryption/decryption process. As a result, a source 104 must retrieve encryption/decryption information for each possible destination 106 and/or must store this encryption/decryption information for each possible destination 106. This makes the prior art situation relatively complex.

According to the invention, a hop-by-hop encryption/decryption is used instead of the known end-to-end encryption/decryption. Between the source 104 and the intermediate 105 a first encryption/decryption process is used and between the intermediate 105 and the destination 106 a second encryption/decryption process is used. As a result, it is no longer necessary to retrieve encryption/decryption information for many possible destinations and/or to store this encryption/decryption information for many possible destinations. Only encryption/decryption information for a few intermediates is to be retrieved and/or only the encryption/decryption information for a few intermediates is to be stored. This is simpler and further advantageous owing to the fact that inside the intermediate the non-encrypted message is available for routing and monitoring and other purposes and that hop-by-hop encryption/decryption allows messages to be multicasted and/or broadcasted, which is difficult for end-to-end encryption/decryption.

In the FIG. 2, steps 10-21 of a method according to the invention are shown. The method may for example comprise and/or form part of a federated security optimized XML-document transfer protocol. The steps 10-21 have the following function:

Step 10: In case (optionally) the message 30 arrives from outside the source 104 (for example in a different format), the message 30 is received and/or detected and/or converted into for example a simple object access protocol message or SOAP message at the source 104, goto step 11.

Step 11: The message 30 is encrypted according to a first encryption/decryption process for gaining a firstly encrypted message 30 at the source 104, goto step 12.

Step 12: The firstly encrypted message 30 is transmitted from the source 104 to the intermediate 105, goto step 13.

Step 13: The firstly encrypted message 30 is received from the source 104 at the intermediate 105, goto step 14.

Step 14: The firstly encrypted message 30 is decrypted according to the first encryption/decryption process for regaining the message 30 at the intermediate 105, goto step 15.

Step 15: In case (optionally) the intermediate 105 comprises a network or a system, the message 30 is for example processed for network-internal or network-external or system-internal or system-external purposes at one part of the intermediate 105 and is for example transmitted to another part of the intermediate 105, goto step 16.

Step 16: In case (optionally) the intermediate 105 comprises a network or a system, the message 30 is for example received from the one part of the intermediate 105 and is for example processed for network-internal or network-external or system-internal or system-external purposes at the other part of the intermediate 105, goto step 17.

Step 17: The message 30 is encrypted according to a second encryption/decryption process for gaining a secondly encrypted message 30 at the intermediate 105, goto step 18.

Step 18: The secondly encrypted message 30 is transmitted to the destination 106, goto step 19.

Step 19: The secondly encrypted message 30 is received from the intermediate 105 at the destination 106, goto step 20.

Step 20: The secondly encrypted message 30 is decrypted according to the second encryption/decryption process for regaining the message 30, goto step 21.

Step 21: In case (optionally) the message 30 is destined to leave the destination 106 (for example in a different format), the message 30 is detected and/or converted into for example a non-SOAP message at the destination 106 and/or transferred.

The first and second encryption/decryption processes are preferably different encryption/decryption processes, to protect different hops in different ways. For example in case of using public keys and private keys, per hop a transmitting party needs to know or to find out a public key of a receiving party. So, per hop the receiving party defines the public key to be used.

In the FIG. 3, an example of a message 30 is shown comprising extensible markup language information in the form of an extensible markup language envelope. An extensible markup language envelope is an envelope that is based on an extensible markup language and/or is an envelope comprising an extensible markup language code. This message 30 for example comprises a message indicator 31, a start envelope field 32, a start header field 33, a header field 34, a stop header field 35, a start body field 36, a body field 37, a stop body field 38, and a stop envelope field 39. The encryption of the message 30 comprises an encryption of one or more fields of the message 30 and a decryption of the message 30 comprising a decryption of these one or more fields of the message 30. Usually, the message indicator 31 is not to be encrypted such that a receiving party is able to understand what kind of message has arrived. The source 104 can define which field is to be encrypted and/or which fields are to be encrypted. In a minimum situation only one field may be encrypted. In a maximum situation, all fields apart from the message indicator 31 preceding the start envelope field 32 may be encrypted. In the prior art, it was not possible to encrypt the header field owing to the fact that the intermediate 105 must be able to route the message. According to the invention, the non-encrypted message is available in the intermediate 105, and as a result between the source 104 and the intermediate 105 the header field can now be encrypted as well, which further improves the overall security and is a great additional advantage. The message 30 may comprise other and/or further fields without departing from the scope of this invention. Its envelope fields 32 and 39 are based on an extensible markup language. The message may alternatively be a message of a federated security optimized XML-document transfer protocol (FS-OXTP).

The encrypting is not to be looked at to narrowly and may further comprise an addition of a signature and the decrypting is not to be looked at to narrowly and may further comprise a detection of the signature. The added signature identifies the sender and improves the overall security and is a great additional advantage. The detection of the signature for example comprises a verification of the signature.

The message 30 for example comprises a simple object access protocol message or SOAP message, without excluding other kinds of messages comprising extensible markup language information. The hop-by-hop encryption/decryption is expected to become a technical and commercial success for SOAP messages.

In case of a message per hop getting a signature, being encrypted, being decrypted and being detected for its signature, in this particular order, the following steps may be performed to realize a resolution process that is much alike a Domain Name Server look-up but now specific to the FS-OXTP:

the source resolves a first intermediate, the source signs and then encrypts, the XML-document is then put on a transport protocol of choice e.g. MIME, HTTP, TCP, UDP thereby making use of existing resolution protocols e.g. DNS and will arrive in the first intermediate, the first intermediate decrypts and then verifies a signature of the source, the first intermediate resolves a next intermediate (or a destination), the first intermediate signs and then encrypts, the XML-document is then put on a transport protocol of choice e.g. MIME, HTTP, TCP, UDP thereby making use of existing resolution protocols e.g. DNS and will arrive in the next intermediate (or destination), these intermediate steps are repeated for each next intermediate until the XML-document has reached the destination, and the destination decrypts and then verifies a signature of the last intermediate.

The source may opt to either not, partly or fully specify the intermediate(s) in the FS-OXTP (as can also be done in OXTP, or in SOAP by means of WS-Addressing). In the first case, the destination will be resolved to the first (or next) intermediate. In the latter cases, the first (or next) intermediate will be resolved either to itself or to another first (or next) intermediate.

The resolution process can be anything from "flat static" tables to "hybrid/hierarchical dynamic" tables, without excluding algorithms, rules, (international) naming conventions and mixtures of these possibilities.

In the FIG. 4, a node 4 representing a source 104 according to the invention is shown, and in the FIG. 5, a node 5 representing an intermediate 105 according to the invention is shown, and in the FIG. 6, a node 6 representing a destination 106 according to the invention is shown.

The node 5 representing an intermediate 105 comprises an interface 53 with an external side and an internal side. The external side is coupled to a coupling that is further coupled to the node 4. The internal side comprises a receiving side coupled via a receiver 54a and a decryption unit 54b to a switch 50 for receiving a message from the node 4 and for supplying this message to the switch 50. The internal side further comprises a transmitting side coupled via a transmitter 52a and an encryption unit 52b to the switch 50 for receiving a message from the switch 50 and for transmitting this message to the node 4. The switch 50, encryption unit 52b, transmitter 52a, interface 53, receiver 54a and decryption unit 54b are further coupled to a controller 51.

The node 5 further comprises an interface 57 with an external side and an internal side. The external side is coupled to a coupling that is further coupled to the node 6. The internal side comprises a receiving side coupled via a receiver 58a and a decryption unit 58b to the switch 50 for receiving a message from the node 6 and for supplying this message to the switch 50. The internal side further comprises a transmitting side coupled via a transmitter 56a and an encryption unit 56b to the switch 50 for receiving a message from the switch 50 and for transmitting this message to the node 6. The switch 50, encryption unit 56b, transmitter 56a, interface 57, receiver 58a and decryption unit 58b are further coupled to a controller 55.

The node 4 representing a source 104 comprises an interface 47 with an external side and an internal side. The external side is coupled to a coupling that is further coupled to the node 5. The internal side comprises a receiving side coupled via a receiver 48a and a decryption unit 48b to the switch 40 for receiving a message from the node 5 and for supplying this message to the switch 40. The internal side further comprises a transmitting side coupled via a transmitter 46a and an encryption unit 46b to the switch 40 for receiving a message from the switch 40 and for transmitting this message to the node 5. The switch 40, encryption unit 46b, transmitter 46a, interface 47, receiver 48a and decryption unit 48b are further coupled to a controller 45.

The node 6 representing a destination 106 comprises an interface 63 with an external side and an internal side. The external side is coupled to a coupling that is further coupled to the node 5. The internal side comprises a receiving side coupled via a receiver 64a and a decryption unit 64b to a switch 60 for receiving a message from the node 5 and for supplying this message to the switch 60. The internal side further comprises a transmitting side coupled via a transmitter 62a and an encryption unit 62b to the switch 60 for receiving a message from the switch 60 and for transmitting this message to the node 5. The switch 60, encryption unit 62b, transmitter 62a, interface 63, receiver 64a and decryption unit 64b are further coupled to a controller 61.

Preferably, in a general situation, such as a non-emergency situation or a non-privileged situation, the decryption units cannot decrypt encrypted messages originating from (at least some) non-neighboring intermediates, sources and destinations, and the encryption units will not encrypt messages destined for (at least some) non-neighboring intermediates, sources and destinations. In a particular situation, such as an emergency situation or a privileged situation, it is not to be excluded that an end-to-end encryption/decryption is to be used, but only for a limited number of destinations. So, each node may comprise a memory for storing the public keys of the neighboring nodes and for storing a limited number of public keys of a limited number of destinations. By detecting a specific address of a specific destination and/or by detecting the message indicator being an emergency message indicator or a privileged message indicator, a node may decide to, for a particular kind of message, deactivate the hop-by-hop encryption/decryption and activate the end-to-end encryption.

The nodes 4-6 shown in the FIG. 4-6 may have many different embodiments. Instead of a switch 40,50,60, one or more servers, multiplexers, forwarders and/or bridges may be present. Even a sub-network of a telecom operator or another party may be present in the nodes 4-6. Further, any block shown in each FIG. 4-6 may be divided into two or more sub-blocks and any two or more blocks shown in each FIG. 4-6 may be combined into one larger block, without departing from the scope of this invention. Each node 4-6 may be further coupled to further couplings not shown, in which case either further interfaces and further receivers/transmitters and further encryption/decryption units may be present or the existing interfaces and the existing receivers/transmitters and the existing encryption/decryption units may be used. In the latter case, the encryption/decryption units need to be adaptable in case different encryption/decryption processes are to be used for different hops all coupled to a same interface. Alternatively, the encryption/decryption units may be integrated into the controllers or the switches to be able to use different encryption/decryption processes without needing to introduce different units for these different processes.

Especially for the nodes 4 and 6, the following must be noted. These nodes 4 and 6 may for example be personal computers or servers or mobile phones, in which case the switches 40 and 60 will be interfaces comprising some kind of a switching function. However, it is not to be excluded that these nodes 4 and 6 may alternatively be systems or networks, in other words the respective nodes 4 and 6 may represent a respective source and destination for one kind of message, but may represent for example intermediates for another kind of message. In that case the (content of the) nodes 4 and 6 may look similar to the (content of the) node 5 etc.

The above-mentioned embodiments illustrate the invention and do not limit the invention. A person skilled in the art will be able to design alternative embodiments without departing from the scope of the claims. In the claims, one or more reference signs placed between brackets are not be construed as limiting the claim. Use of "to comprise" and its conjugations does not exclude the presence of elements or steps other than those stated in a claim. The article "a" or "an" preceding an element or a step does not exclude the presence of a plurality of such elements or steps.

The invention claimed is:

1. An intermediate network node, comprising:
a receiver operative to receive a firstly encrypted message from a predecessor network node for transmission to a successor network node;
a decryption unit operative to decrypt the firstly encrypted message according to a first encryption/decryption process to provide a regained message, the first encryption/decryption process being defined by the identities of the intermediate network node and the predecessor network node;
an encryption unit operative to encrypt the regained message according to a second encryption/decryption process to provide a secondly encrypted message, the second encryption/decryption process being defined by the identities of the intermediate network node and the successor network node; and
a transmitter operative to transmit the secondly encrypted message to the successor network node.

2. The intermediate network node of claim 1:
wherein the decryption unit is operative to determine a decryption key according to the identities of the intermediate network node and the predecessor network node, and to decrypt the firstly encrypted message according to the first encryption/decryption process using the decryption key to provide the regained message; and
wherein the encryption unit is operative to determine an encryption key according to the identities of the intermediate network node and the successor network node, and to encrypt the regained message according to the second encryption/decryption process using the encryption key to provide the secondly encrypted message.

3. The intermediate network node of claim 2:
wherein the decryption unit is operative to determine the decryption key independent of source or destination programs associated with firstly encrypted message; and
wherein the encryption unit is operative o determine the encryption key independent of source or destination programs associated with the firstly encrypted message.

4. The intermediate network node of claim 3, wherein the firstly encrypted message comprises a header field indicating a destination of the firstly encrypted message, wherein the decryption unit is operative to decrypt the header field of the firstly encrypted message, and wherein the encryption unit is operative to encrypt the header field of the regained message.

5. The intermediate network node of claim 4, where the decryption unit is operative to decrypt encrypted messages originating from at least one neighboring network node and is not arranged to decrypt encrypted messages originating from at least one non-neighboring network node, and where the encryption unit is arranged to encrypt regained messages destined for at least one neighboring network node and is not arranged to encrypt regained messages destined for at least one non-neighboring network node.

6. The intermediate network node of claim 5, wherein the encryption unit is operative to add a signature to the secondly encrypted message.

7. The intermediate network node of claim 1:
wherein the first encryption/decryption process is defined by the identities of the intermediate network node and the predecessor network node independent of source or destination programs associated with the firstly encrypted message; and
wherein the second encryption/decryption process is defined by the identities of the intermediate network node and the successor network node independent of source or destination programs associated with the firstly encrypted message.

8. The intermediate network node of claim 7, where n the firstly encrypted message comprises a header field indicating a destination of the firstly encrypted message, wherein the decryption unit is operative to decrypt the header field of the firstly encrypted message, and wherein the encryption unit is operative to encrypt the header field of the regained message.

9. The intermediate network node of claim 7, where the decryption unit is operative to decrypt encrypted messages originating from at least one neighboring network node and is not arranged to decrypt encrypted messages originating from at least one non-neighboring network node, and where the encryption unit is arranged to encrypt regained messages destined for at least one neighboring network node and is not arranged to encrypt regained messages destined for at least one non-neighboring network node.

10. The intermediate network node of claim 7, wherein the encryption unit is operative to add a signature to the secondly encrypted message.

11. The intermediate network node of claim 1, wherein the firstly encrypted message comprises a header field indicating a destination of the firstly encrypted message, wherein the decryption unit is operative to decrypt the header field of the firstly encrypted message, and wherein the encryption unit is operative to encrypt the header field of the regained message.

12. The intermediate network node of claim 1, where the decryption unit is operative to decrypt encrypted messages originating from at least one neighboring network node and is not arranged to decrypt encrypted messages originating from at least one non-neighboring network node, and where the encryption unit is arranged to encrypt regained messages destined for at least one neighboring network node and is not arranged to encrypt regained messages destined for at least one non-neighboring network node.

13. The intermediate network node of claim 1, wherein the encryption unit is operative to add a signature to the secondly encrypted message.

14. A method for transferring a message from a first network node via a second network node to a third network node, the method comprising:

at the second network node, receiving a firstly encrypted message from the first network node;
at the second network node, decrypting the firstly encrypted message according to a first encryption/decryption process to provide a regained message, the first encryption/decryption process being defined by the identities of the first and second network nodes;
at the second network node, encrypting the regained message according to a second encryption/decryption process to provide a secondly encrypted message, the second encryption/decryption process being defined by the identities of the second and third network nodes; and
transmitting the secondly encrypted message from the second network node to the third network node.

15. The method of claim 14:
wherein decrypting the firstly encrypted message comprises:
determining a decryption key according to the identities of the first and second network nodes, and
decrypting the firstly encrypted message according to the first encryption/decryption process using the decryption key to provide the regained message; and
wherein encrypting the regained message comprises:
determining an encryption key according to the identities of the second and third network nodes, and
encrypting the regained message according to the second encryption/decryption process using the encryption key to provide the secondly encrypted message.

16. The method of claim 15, wherein the decryption key and the encryption key are determined independent of source or destination programs associated with the firstly encrypted message.

17. The method of claim 14, wherein the first and second encryption/decryption processes are defined independent of source or destination programs associated with the firstly encrypted message.

18. The method of claim 14, wherein the firstly encrypted message comprises a header field indicating a destination of the firstly encrypted message, wherein decrypting the firstly encrypted message comprises decrypting the header field of the firstly encrypted message, and wherein encrypting the regained message comprises encrypting the header field of the regained message.

19. The method of claim 14, comprising:
decrypting encrypted messages originating from at least one neighboring network node;
refraining from decrypting encrypted messages originating from at least one non-neighboring network node;
encrypting regained messages destined for at least one neighboring network node; and
refraining from encrypting regained messages destined for at least one non-neighboring network node.

20. The method of claim 14, further comprising adding a signature to the secondly encrypted message.

\* \* \* \* \*